(12) United States Patent
Pays

(10) Patent No.: US 11,897,033 B2
(45) Date of Patent: Feb. 13, 2024

(54) PROCESS FOR THE ADDITIVE MANUFACTURING OF A THREE-DIMENSIONAL METAL PART

(71) Applicant: COMPAGNIE GENERALE DES ETABLISSEMENTS MICHELIN, Clermont-Ferrand (FR)

(72) Inventor: Pierre Pays, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 17/048,790

(22) PCT Filed: Apr. 17, 2019

(86) PCT No.: PCT/FR2019/050919
§ 371 (c)(1),
(2) Date: Oct. 19, 2020

(87) PCT Pub. No.: WO2019/202263
PCT Pub. Date: Oct. 24, 2019

(65) Prior Publication Data
US 2021/0146446 A1   May 20, 2021

(30) Foreign Application Priority Data

Apr. 19, 2018   (FR) ........................................ 1853456

(51) Int. Cl.
*B22F 12/49*   (2021.01)
*B33Y 10/00*   (2015.01)
(Continued)

(52) U.S. Cl.
CPC .............. *B22F 12/49* (2021.01); *B22F 5/007* (2013.01); *B22F 10/28* (2021.01); *B22F 10/366* (2021.01);
(Continued)

(58) Field of Classification Search
CPC .... B23K 26/342; B22F 10/20; B22F 2207/17; B33Y 10/00; B26C 64/153
See application file for complete search history.

(56) References Cited

U.S. PATENT DOCUMENTS 4,772,773 A * 9/1988 Hashimoto ........ B23K 15/0086
219/121.64
5,640,667 A    6/1997 Freitag et al.
(Continued)

FOREIGN PATENT DOCUMENTS

CN    105102160 A   11/2015
EP      0863806 A1    9/1998
(Continued)

OTHER PUBLICATIONS

WO-2008074287-A1 machine translation (Year: 2008).*
(Continued)

*Primary Examiner* — Michael W Hotchkiss
(74) *Attorney, Agent, or Firm* — VENABLE LLP

(57) ABSTRACT

A process for the additive manufacturing of a three-dimensional metal part consists of successively solidifying successively deposited layers of metal powder by melting with a laser beam (120), and defining in each of these successive layers at least one core region (210) and/or at least one shell region. The melting of said core regions (210) is effected with said laser beam (120) so as to form weld beads (211) that have identical widths (L), are mutually parallel and are juxtaposed or spaced apart or overlap over a distance less than X % of their width, and the melting of said shell regions is effected similarly to form weld beads that have identical widths to one another and to the weld beads of the core, are mutually parallel and that overlap over a distance greater than X % of their width, X being greater than 0 and less than 100.

8 Claims, 5 Drawing Sheets

(51) Int. Cl.
    *B22F 12/41*     (2021.01)
    *B22F 10/28*     (2021.01)
    *B22F 5/00*     (2006.01)
    *B22F 10/366*     (2021.01)
    *B33Y 80/00*     (2015.01)

(52) U.S. Cl.
    CPC .............. *B22F 12/41* (2021.01); *B33Y 10/00* (2014.12); *B33Y 80/00* (2014.12)

(56) References Cited

U.S. PATENT DOCUMENTS

| | | | |
|---|---|---|---|
| 7,229,544 B2* | 6/2007 | Cohen | B81C 1/00492 |
| | | | 205/118 |
| 9,878,497 B2* | 1/2018 | Schwarze | B22F 12/00 |
| 10,201,962 B2* | 2/2019 | Teulet | B29C 64/141 |
| 10,343,216 B2* | 7/2019 | Domrose | B22F 12/00 |
| 10,369,629 B2* | 8/2019 | Symeonidis | B22F 12/00 |
| 10,479,020 B2* | 11/2019 | Madigan | B29C 64/135 |
| 10,493,562 B2* | 12/2019 | Dimter | B22F 10/20 |
| 10,814,392 B2* | 10/2020 | Hellestam | B33Y 10/00 |
| 10,850,351 B2* | 12/2020 | Teulet | B23P 23/04 |
| 2004/0129573 A1 | 7/2004 | Cohen | |
| 2004/0191106 A1 | 9/2004 | O'Neill et al. | |
| 2005/0142024 A1 | 6/2005 | Herzog | |
| 2007/0035069 A1 | 2/2007 | Wust et al. | |
| 2008/0004709 A1* | 1/2008 | O'Neill | A61F 2/3859 |
| | | | 623/20.35 |
| 2008/0241392 A1* | 10/2008 | Dimter | B33Y 70/00 |
| | | | 427/256 |
| 2009/0121393 A1* | 5/2009 | Abe | B22F 10/20 |
| | | | 264/497 |
| 2009/0286008 A1 | 11/2009 | O'Neill et al. | |
| 2010/0291286 A1 | 11/2010 | O'Neill et al. | |
| 2012/0041586 A1 | 2/2012 | Abe et al. | |
| 2013/0040091 A1* | 2/2013 | Dikovsky | B29C 64/393 |
| | | | 428/68 |
| 2013/0056912 A1 | 3/2013 | O'Neill et al. | |
| 2014/0271328 A1* | 9/2014 | Burris | B23K 26/034 |
| | | | 419/53 |
| 2014/0348692 A1 | 11/2014 | Bessac et al. | |
| 2015/0158249 A1* | 6/2015 | Goto | B33Y 30/00 |
| | | | 264/40.1 |
| 2015/0258735 A1 | 9/2015 | O'Neill et al. | |
| 2016/0001401 A1 | 1/2016 | Dimter et al. | |
| 2016/0279735 A1 | 9/2016 | Hellestam | |
| 2016/0282848 A1* | 9/2016 | Hellestam | B22F 3/105 |
| 2016/0288209 A1* | 10/2016 | Jakimov | B33Y 30/00 |
| 2017/0014904 A1* | 1/2017 | Brown | B22F 10/30 |
| 2017/0021455 A1* | 1/2017 | Dallarosa | B22F 10/28 |
| 2017/0095861 A1* | 4/2017 | Dykstra | B22F 3/10 |
| 2017/0216922 A1 | 8/2017 | Desvignes et al. | |
| 2017/0232515 A1* | 8/2017 | DeMuth | B29C 64/386 |
| | | | 419/53 |
| 2017/0239726 A1* | 8/2017 | Palumbo | B01D 39/14 |
| 2017/0282244 A1 | 10/2017 | Mizuno et al. | |
| 2017/0333991 A1 | 11/2017 | Kanai | |
| 2018/0243977 A1* | 8/2018 | Meinders | B22F 10/38 |
| 2018/0250774 A1* | 9/2018 | Symeonidis | B23K 26/1224 |
| 2018/0290241 A1* | 10/2018 | Mcclelland | B29C 64/153 |
| 2018/0290396 A1* | 10/2018 | Gold | B29C 64/386 |
| 2018/0369909 A1* | 12/2018 | Ibe | B22F 1/148 |
| 2019/0025798 A1* | 1/2019 | Yamasaki | B22F 3/16 |
| 2019/0054567 A1* | 2/2019 | Roerig | B33Y 10/00 |
| 2019/0134754 A1* | 5/2019 | Jacquemetton | B22F 10/368 |
| 2019/0143606 A1* | 5/2019 | Hertel | B33Y 50/02 |
| | | | 264/497 |
| 2019/0255614 A1* | 8/2019 | Madigan | B23K 26/342 |
| 2019/0255654 A1* | 8/2019 | Beckett | B23K 26/0643 |
| 2019/0275614 A1* | 9/2019 | Imoto | B23K 26/354 |
| 2020/0023463 A1 | 1/2020 | Dimter et al. | |
| 2020/0269352 A1* | 8/2020 | Maurer | B33Y 80/00 |
| 2021/0079796 A1* | 3/2021 | Geisen | B22F 10/28 |

FOREIGN PATENT DOCUMENTS

| | | | | |
|---|---|---|---|---|
| EP | 1418013 | A1 | 5/2004 | |
| EP | 2402097 | A1 | 1/2012 | |
| EP | 3219468 | A1 | 9/2017 | |
| WO | WO-2008074287 | A1 * | 6/2008 | ............ B22F 10/366 |
| WO | 2016/016136 | A1 | 2/2016 | |
| WO | WO-2019094280 | A1 * | 5/2019 | ............. B22F 12/00 |

OTHER PUBLICATIONS

International Search Report dated Oct. 31, 2019, in corresponding PCT/FR2019/050919 (9 pages).

R. Li, et al., "316L Stainless Steel with Gradient Porosity Fabricated by Selective Laser Melting", Journal of Materials Engineering and Performance, vol. 19, No. 5, pp. 666-671, XP055141597 (2009).

* cited by examiner

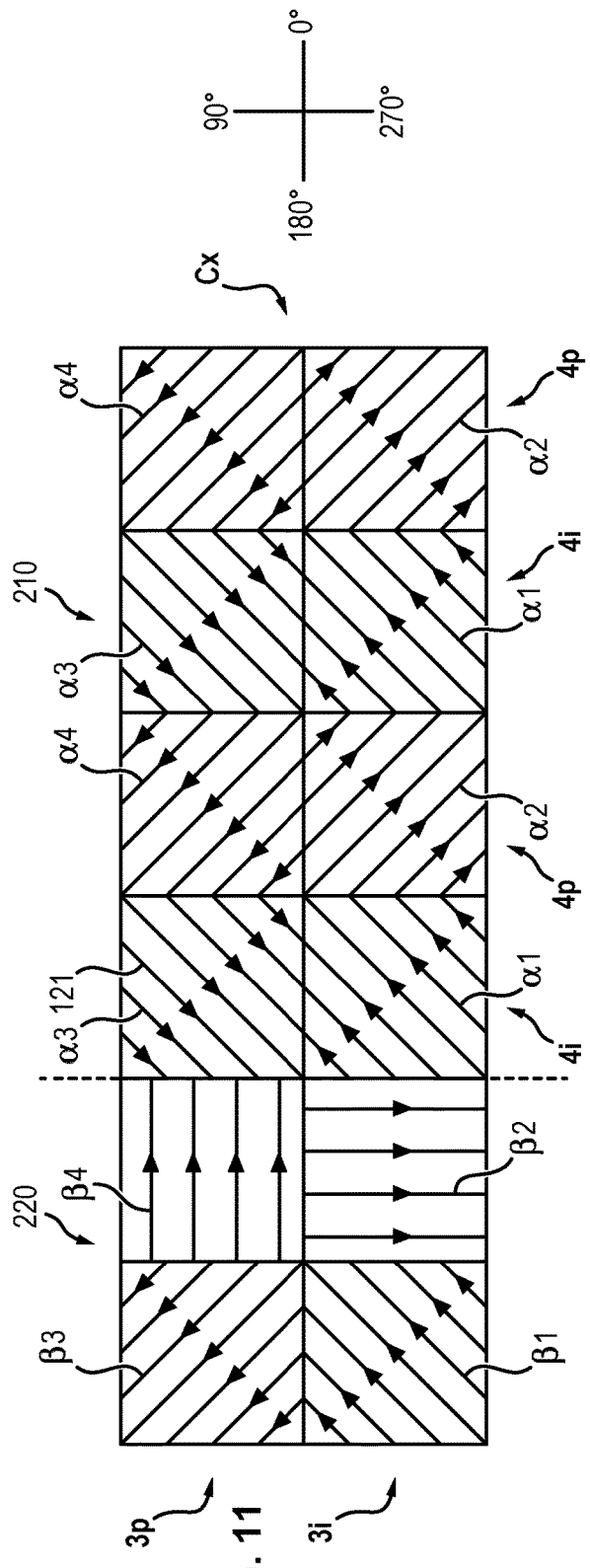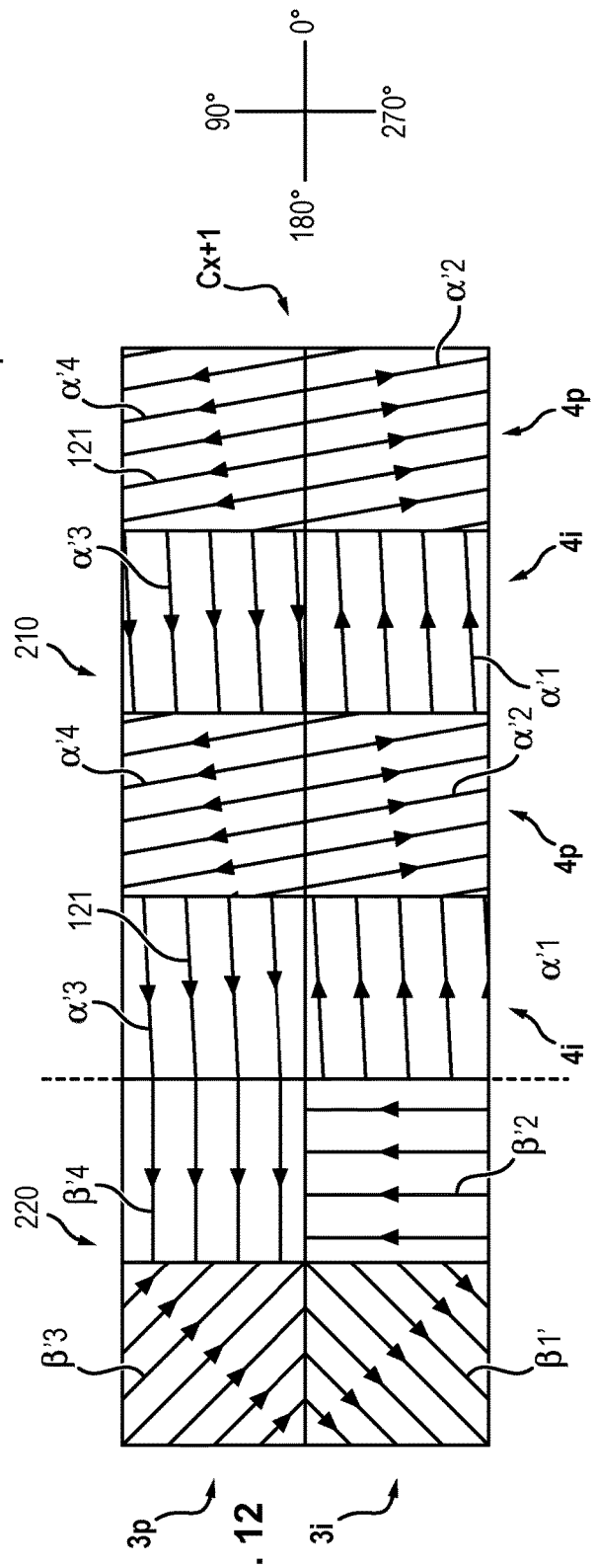

PROCESS FOR THE ADDITIVE MANUFACTURING OF A THREE-DIMENSIONAL METAL PART

GENERAL TECHNICAL FIELD

The invention lies in the field of additive manufacturing.

The present invention relates more specifically to a process for the additive manufacturing of a three-dimensional metal part, having at least one monolithic part, such as a thin blade for forming furrows in the tread of a tyre, said thin blade being intended to be inserted into a curing Mould of said tyre.

PRIOR ART

Additive manufacturing makes it possible to manufacture metal parts by repeating a cycle comprising a step of depositing a layer of metal powder, followed by a step of melting this layer by way of electromagnetic radiation, for example with the aid of a laser beam.

This type of process generates severe stresses that deform the parts manufactured in this way, on account of significant temperature gradients. These deformations are all the greater when the part to be manufactured exhibits large variations in thickness. These deformations can cause tears.

By way of example, the appended FIG. 1A shows a perspective view of an exemplary embodiment of a thin blade as mentioned above and FIG. 1B schematically shows the vertical cross section of the thin blade in FIG. 1A. This thin blade A, which is referred to as being of the "droplet" type, comprises two parts, namely a body B and a monolithic part or "droplet" C, respectively. The free end of the body B is intended to be embedded in the mass of the curing mould of the tyres, while the opposite end of the body B and the droplet C project from the bottom of this mould. Thus, when the rubber is moulded, such a thin blade makes it possible to produce a large, fairly wide cavity, corresponding to the part C, in the depth of the tyre, this cavity being continued towards the outside of the surface of the tyre by a thin groove corresponding to a portion of the tongue of the thin body B. Such a thin blade A thus makes it possible to produce furrows of a particular shape on a tyre.

It will be readily understood that, in the transition zone D between B and C, the stresses brought about by the additive manufacturing process risk weakening the thin blade A, or even rupturing it, and this can be particularly detrimental during the moulding of a tyre.

SUMMARY OF THE INVENTION

The aim of the invention is to provide a process for the additive manufacturing of a three-dimensional metal part having at least one monolithic part, which makes it possible to greatly reduce the stresses exerted on this part, cracks and deformations, while ensuring good mechanical strength of the part as a whole.

A "monolithic" part is understood, in the rest of the description and the claims, as being a solid part that preferably has a cross section with a width greater than 2 mm.

A further aim of the invention is to provide a process as mentioned above that can be applied essentially to parts that exhibit large variations in thickness.

To this end, the invention relates to a process for the additive manufacturing of a three-dimensional metal part having at least one monolithic part, such as a thin blade for forming furrows in the tread of a tyre, said thin blade being intended to be inserted into a curing mould of said tyre, this monolithic part of the metal part comprising an inner part, referred to as a "core", surrounded by an outer part, referred to as a "shell", this process consisting in successively solidifying successively deposited layers of metal powder by melting with the aid of a laser beam, and in defining in each of these different successive layers of powder either at least one shell region, which constitutes a portion of said shell of the metal part to be manufactured, or at least one core region, surrounded by a shell region, said core region constituting a portion of said core of the metal part to be manufactured.

According to the invention, the melting of said core regions is effected by scanning with said laser beam so as to form longitudinal weld beads that have identical widths, are mutually parallel and that are either juxtaposed or spaced apart from one another by a distance less than X % of their width, or overlap over a distance less than X % of their width, and the melting of said shell regions is effected by scanning with said laser beam so as to form longitudinal weld beads that have identical widths and an identical width to the weld beads of the core, are mutually parallel and that overlap over a distance greater than X % of their width, X being greater than 0 and less than 100.

By virtue of these features of the invention, it is possible to reduce the mechanical stresses while ensuring a sufficient density of the shell and of the core. The part obtained has good mechanical properties (increased strength, lack of tears or of rupture initiation zones).

According to other advantageous and non-limiting features of the invention, considered alone or in combination:
- X is equal to 30;
- the melting of said core regions is effected by scanning with said laser beam so as to form adjacent weld beads that are spaced apart from one another by a distance less than 20%, preferably less than 10%, of the width of these beads;
- the melting of said core regions is effected by scanning with said laser beam so as to form weld beads that overlap over a distance less than 20%, preferably less than 10%, of the width of these weld beads;
- the melting of said shell regions is effected by scanning with said laser beam so as to form weld beads that overlap over a distance greater than 30% and less than or equal to 60%, preferably greater than or equal to 40% and less than or equal to 50% of the width of these beads;
- the core and the shell overlap over a width of between 0.01 mm and 0.40 mm, preferably over a width of 0.10 mm;
- at least one core region of a layer of metal powder comprises at least two zones, and, among these zones, the scanning of at least one given zone with said laser beam is effected such that the displacement vectors of said laser beam have an orientation angle with respect to a trigonometric coordinate system that is different from the orientation angle of the displacement vectors of said laser beam in a zone contiguous with said given zone;
- at least one shell region of a layer of metal powder comprises at least two zones, and, among these zones, the scanning of at least one given zone with said laser beam is effected such that the displacement vectors of said laser beam have an orientation angle with respect to a trigonometric coordinate system that is different from the orientation angle of the displacement vectors of said laser beam in a zone contiguous with said given zone;

said zones are square and disposed in the form of a chequerboard, this chequerboard comprising at least two rows referred to as "even" and "odd";

in each core region and/or in each shell region, the melting of a given layer of metal powder is effected by scanning, with the aid of said laser beam, the zones of the odd rows and of the odd columns, referred to as "first zones", at a first orientation angle, the zones of the odd rows and of the even columns, referred to as "second zones", at a second orientation angle, the zones of the even rows and of the odd columns, referred to as "third zones", at a third orientation angle, and the zones of the even rows and of the even columns, referred to as "fourth zones", at a fourth orientation angle, these four orientation angles with respect to a trigonometric coordinate system being different;

the metal part comprises n successive superposed layers, the orientation angles of the displacement vectors of the laser beam in the first, second, third and fourth zones, respectively, of the core region of one layer exhibit an angular variation with the orientation angles of the displacement vectors of the laser beam in the first, second, third and fourth zones, respectively, of the core region of the layer situated thereabove, the orientation angles of the displacement vectors of the laser beam in the first, second, third and fourth zones, respectively, of the shell region of one layer exhibit an angular variation with the orientation angles of the displacement vectors of the laser beam in the first, second, third and fourth zones, respectively, of the shell region of the layer situated thereabove, and these two angular variations are different;

the core of the part comprises n successive superposed layers, and the square core zones of one layer are offset by 1/q step, q being an integer, preferably equal to 2, laterally and/or longitudinally with respect to the square core zones of the layer situated immediately thereabove;

the shell of the part comprises n successive superposed layers, and in that the square shell zones of one layer are offset by 1/q step, q being an integer, preferably equal to 2, laterally and/or longitudinally with respect to the square shell zones of the layer situated immediately thereabove.

BRIEF DESCRIPTION OF THE FIGURES

Further features and advantages of the invention will become apparent from the description which will now be given thereof, with reference to the appended drawings which show, by way of non-limiting example, different possible embodiments thereof.

In these drawings:

FIGS. 11 and 12 are schematic top views showing an example of the orientation of the scanning vectors of the laser beam during the melting of different zones of the shell region and of the core region of two successive layers of metal powder.

DETAILED DESCRIPTION OF THE INVENTION

An exemplary embodiment of an additive manufacturing installation making it possible to implement the process according to the invention will now be described in conjunction with FIG. 3.

This installation 1 comprises a support 10, a device 11 for dispensing metal powder and a laser 12.

Figure 3:
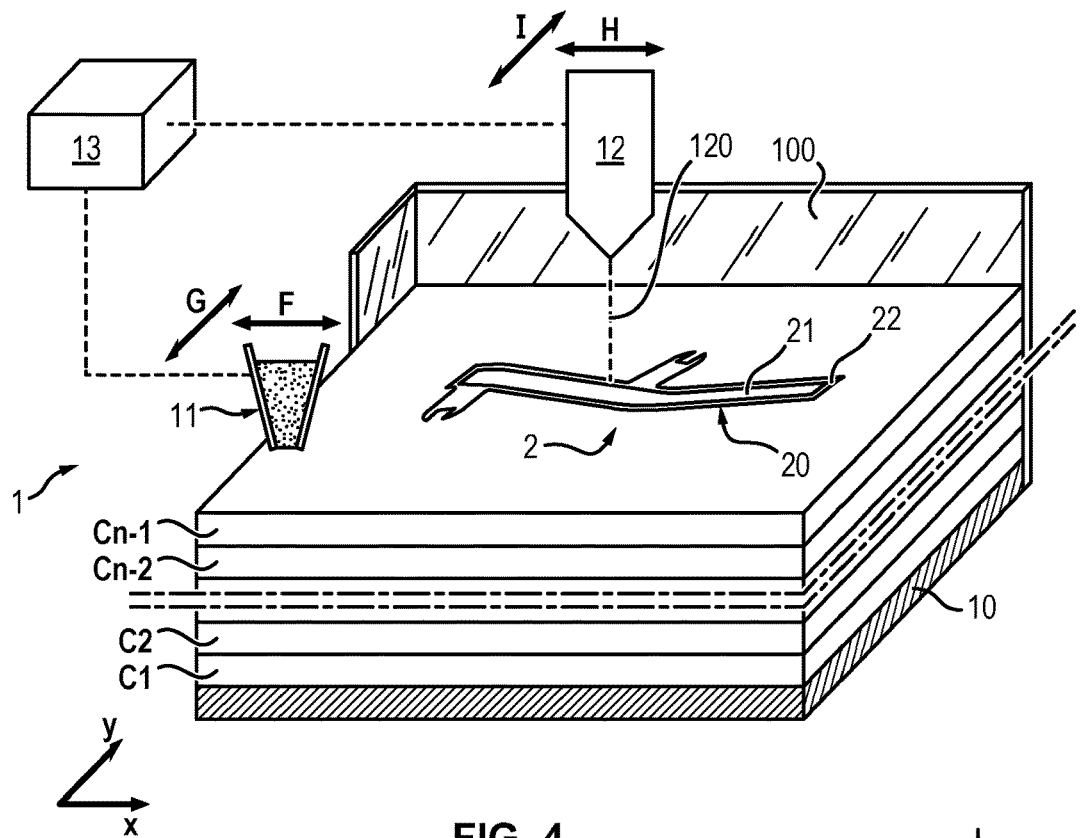
FIG. 3 is a schematic view showing an example of an additive manufacturing installation making it possible to implement the additive manufacturing process according to the invention.

The dispensing device 11 makes it possible to deposit a first layer C1 of metal powder on the support 10, this layer being retained by the rims 100 of the support 10, shown only partially in FIG. 3. The device 11 is controlled by a central unit 13, such as a computer, so as to ensure the movement thereof in two perpendicular directions x and y (that is to say in the width-wise direction and the depth-wise direction, respectively, in FIG. 3), specifically in both senses for each of these directions (arrows F and G). Further devices 11 can move in other ways, for example only in the direction x but dispensing the powder over the entire depth in a single pass.

Once the first layer C1 has been deposited, the laser 12, controlled by the central unit 13, is moved over the layer of powder C1, likewise in the directions x and y and in both senses for each direction (arrows H and I), so as to melt the layer of metal powder C1, but only within the contour 20 of the three-dimensional part 2 to be manufactured.

Once this step has been carried out, a second layer of metal powder C2 is formed on top of the first C1, with the aid of the dispensing device 11, and the laser 12 is actuated once again to melt the powder over the area of the part 2.

The procedure is then repeated until the n layers required for manufacturing the product 2 have been deposited. In FIG. 3, the layers Cn-1 and Cn-2 correspond to the penultimate and the antepenultimate layers, respectively, of the n layers deposited.

The parameters of the laser 12, such as its power, its speed of movement and its focal distance are adapted in accordance with the nature of the metal powder to be melted.

The part 2 to be manufactured is modelled in three dimensions so as to define an inner region 21, referred to as a "core", surrounded by an outer region 22, referred to as a "shell", which constitutes a kind of superficial "skin" covering the entire part 2.

3D modelling techniques are known to a person skilled in the art and will not be described in detail here.

Figure 1A:
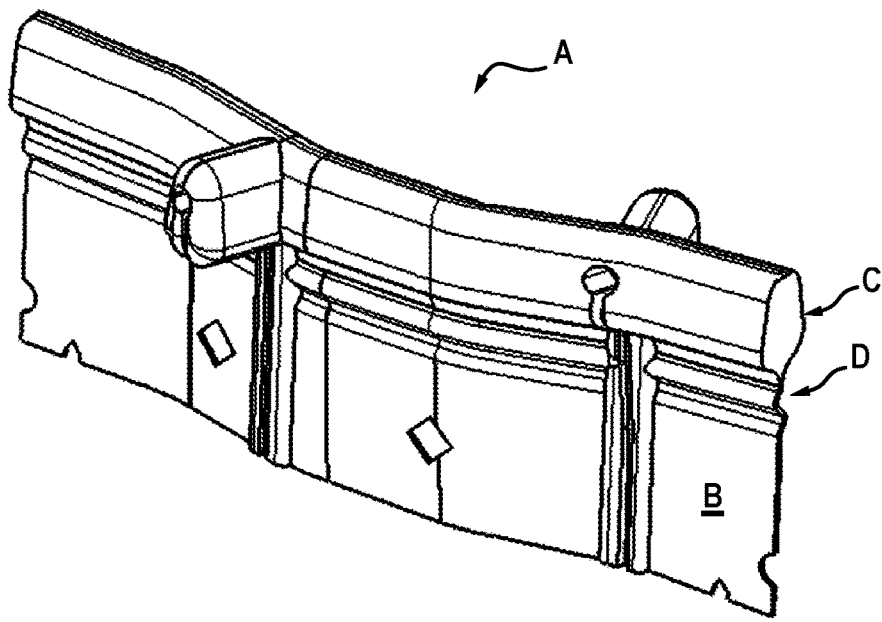
FIG. 1A is a perspective view of an exemplary embodiment of a thin blade for forming furrows in the tread of a tyre, said thin blade being intended to be inserted into a curing mould of said tyre, FIG. 1B schematically shows a cross-sectional view of a thin blade.
Figure 1B:
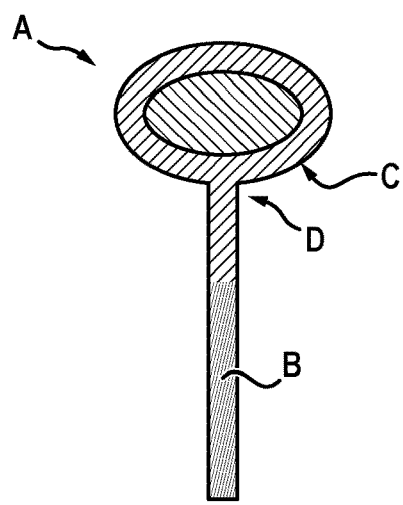
Figure 2:
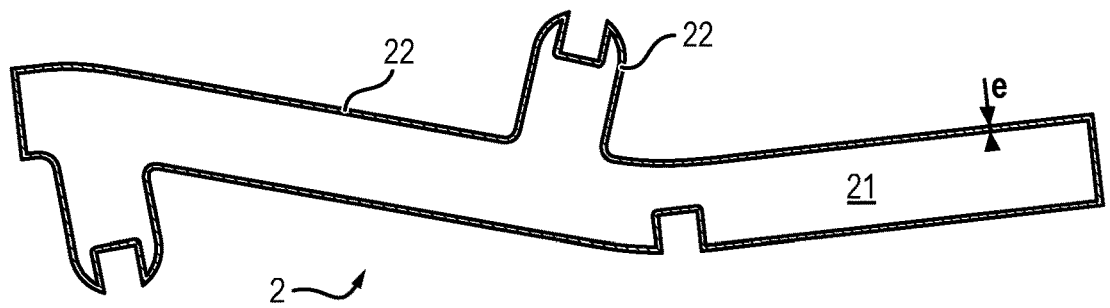
FIG. 2 is a view in longitudinal section of the monolithic part of a thin blade for forming furrows, said thin blade having been obtained by the process according to the invention.

An example of a part 2 in section (in this case a thin blade as mentioned above), exhibiting a region of core 21 and a region of shell 22, is shown in FIG. 2.

The shell 22 preferably has a thickness e of between 0.1 mm and 4 mm, more preferably equal to 0.4 mm.

However, it will be noted that, for reasons associated with problems of mechanical strength or the use of certain 3D modelling software, certain outgrowths of the part 2 can be modelled as regions of shell 22 and will then have a thickness greater than 4 mm.

In order to understand the process according to the invention, reference will now be made to FIGS. 5 and 6.

Figure 5:
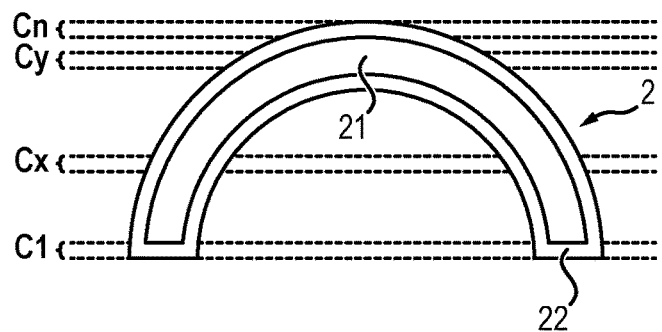
FIG. 5 is a schematic view in vertical section of a metal part manufactured by the process according to the invention, the shape of which does not correspond to a thin blade but which explains the principle of the invention.

FIG. 5 shows a view in vertical cross section of a three-dimensional metal part 2 obtained by additive manufacturing. Here, this part schematically has an arched shape.

On the left-hand side of FIG. 5, several of the n layers of powder that have enabled the production of this part are shown. These n layers are referenced C1, Cx, Cy and Cn, x, y and n corresponding to the numbers of the layers and x and y being between 1 and n.

Figure 6:
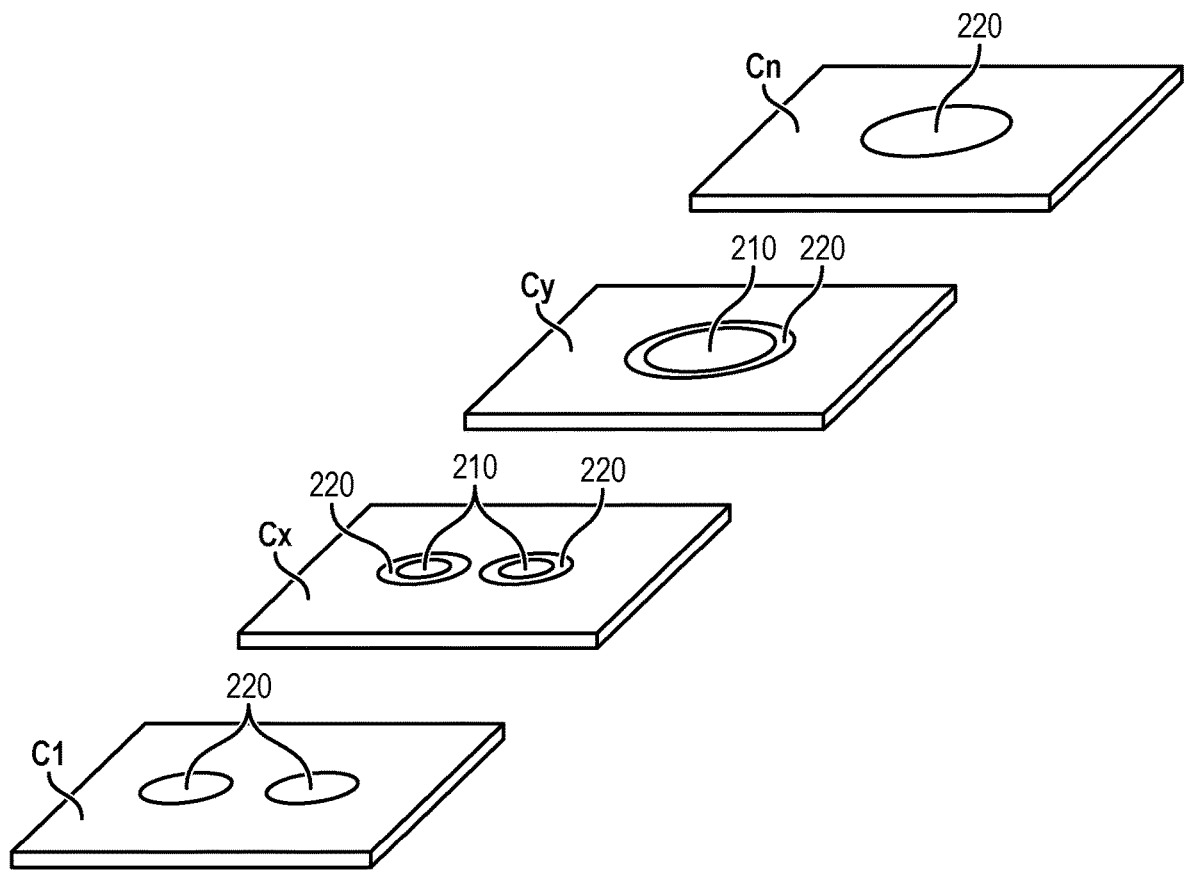
FIG. 6 is an exploded schematic view showing different layers of metal powder used in the manufacturing of the part in FIG. 5.

These different layers C1 to Cn are then shown in the exploded view in FIG. 6. It can be seen that, for each layer of powder C1, Cx, Cy and Cn, either at least one shell region or at least one core region surrounded by a shell region is defined.

The first layer of powder C1 comprises two shell regions 220, while the final layer Cn only comprises one, given the shape of the part 2.

In the intermediate layer Cx, there are two core regions 210, each surrounded by a shell region 220, while in the layer Cy, only one core region 210 surrounded by one shell region 220 can be seen. The shell regions 220 together define the shell 22 of the part 2. Similarly, the core regions 210 together define the core 21 of the part 2.

As described below, the movement parameters of the laser beam are different, depending on whether it is used to melt the core 21 or the shell 22 of the part 2.

Figure 7:
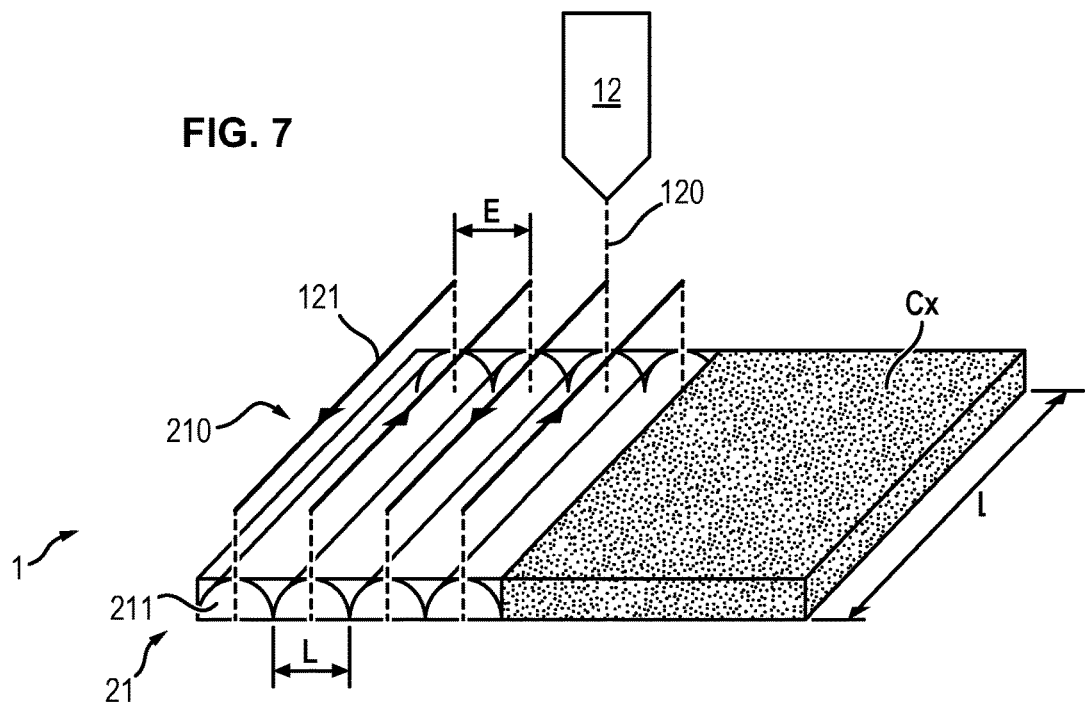
FIG. 7 is a schematic view of a layer of metal powder of the core, a part of which has been melted in the form of weld beads.

With reference to FIG. 7, it can be seen that the melting of a region of a layer Cx of metal powder is effected by scanning with the aid of the beam 120 of the laser 12 over this layer Cx so as to form parallel weld beads. In this figure, which shows a region of core 21, the weld beads are referenced 211.

The laser 12 is moved such that its beam 120 follows mutually parallel displacement vectors 121, these vectors being spaced apart from one another by a spacing E.

Preferably, the laser 12 is moved along a trajectory running back-and-forth and from one side of the layer to be treated to the other, for example in this case from the left to the right in the figure.

According to the invention, the formation of these weld beads is effected differently in the shell region and in the core region.

According to the invention, the melting of each region 210 of core 21 is effected by scanning with the aid of the laser beam 120 along the displacement vectors 121 so as to form longitudinal weld beads 211 that are mutually parallel and have identical widths L (the width L being parallel to the spacing E between two displacement vectors of the beam and perpendicular to the vectors 121).

Figure 8:
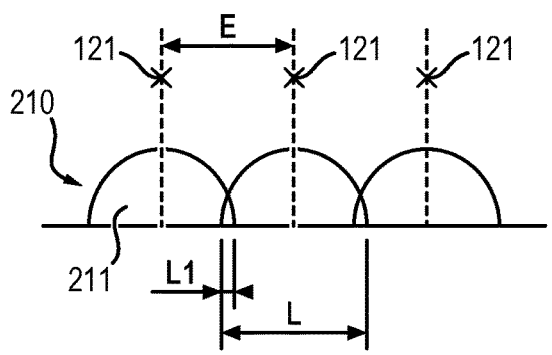
FIGS. 8 and 9 are diagrams showing two embodiment variants of the melting of a layer of powder of the core of a metal part to be manufactured.
Figure 9:
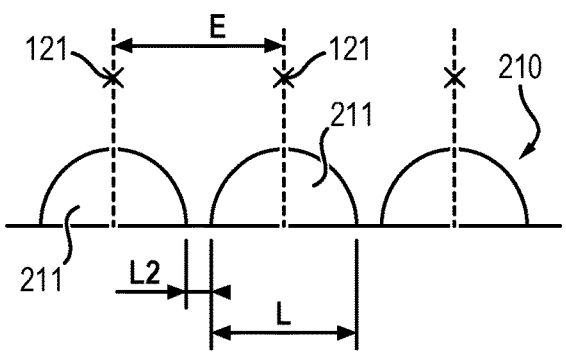

Moreover, this melting is effected such that the weld beads 211 formed are juxtaposed, as shown in FIG. 7, (and in this case the spacing E is equal to the width L), and the beads touch, or such that the weld beads 211 overlap partially over a distance L1 less than X % of the width L of the bead 211, as shown in FIG. 8, (and in this case the spacing E is less than the width L), or such that the weld beads 211 are spaced apart from one another by a distance L2 less than X % of the width L of the bead 211, as shown in FIG. 9, (and in this case the spacing E is greater than the width L). X is greater than 0 and less than 100. Preferably, X is equal to 30.

More preferably, two contiguous core weld beads 211 overlap over a distance L1 less than 20%, or even less than 10%, of the width L of these weld beads 211.

More preferably, two adjacent contiguous core weld beads 211 are spaced apart from one another by a distance L2 less than 20%, or even less than 10%, of the width L of these beads 211.

According to the invention, the melting of each shell region 220 is effected by scanning with the laser beam 120 along the displacement vectors 121 so as to form longitudinal weld beads 221 that are mutually parallel and have identical widths L to one another (L being parallel to the spacing E and perpendicular to the vectors 121). Moreover, the shell weld beads 221 have identical widths to the core weld beads 211.

Figure 10:
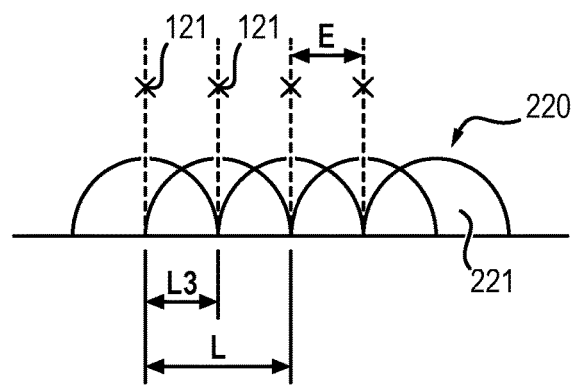
FIG. 10 is a diagram showing the melting of a layer of powder of the shell of a metal part to be manufactured.

Moreover, this melting is effected such that the weld beads 211 overlap, over a distance L3 greater than X % of the width L of the bead 221, as shown in FIG. 10 (and in this case the spacing E is less than the width L). Preferably, X is greater than 0 and less than 100.

More preferably, two contiguous shell weld beads 221 overlap over a distance L3 greater than 30% and less than or equal to 60% of the width L of the bead 221, or better still over a distance L3 greater than or equal to 40% and less than or equal to 50% of the width L.

Thus, by using different overlap parameters between the shell and core regions and in particular a greater overlap in the shell regions than in the core regions, the stresses within the part 2 manufactured in this way are reduced, while ensuring sufficient density both of the shell and of the core and obtaining a part that exhibits good mechanical strength properties.

In this way, a shell 22 having a density greater than 99% and a core having a density of between 95% and 99% are obtained.

A method for determining the density of the shell or of the core obtained in this way can be as follows. This method consists in cutting the shell or the core into different sections, for example around ten sections in planes perpendicular to the weld bead. Next, each face of the sections formed by the cut is polished, for example using an abrasive disc. This polishing step makes it possible to reduce the surface roughness of the face, thereby making it possible to make the porous parts that open onto this face more visible. The face is then photographed and this photograph is processed using image processing software. The software makes it possible to obtain a processed photo showing dark zones corresponding to porous parts and light zones corresponding to non-porous parts, that is to say polished parts. The ratio between the area of the light zones and the total area of the face thus makes it possible to determine the density of the face of this section. By repeating these operations of polishing, photographing and image processing for different sections and by averaging the results obtained, it is thus possible to determine the overall density of the part obtained.

Depending on the shape of the part 2, it is possible to have several monolithic core regions 210 that are more than 2 mm wide and not contiguous, see for example the layer Cx in FIG. 6.

Preferably, a core region 210 and a shell region 220 overlay one another (overlap) over a width of between 0.01 mm and 0.40 mm, preferably equal to 0.10 mm in one and the same layer, so as to ensure a good bond between the two regions. In this case, the zone of shell/core overlay will be melted twice with the two abovementioned manners of overlay of the vectors along the shell and along the core.

Another melting parameter on which it is possible to act in the process according to the invention relates to the orientation of the displacement vectors 121 of the laser beam 120.

Thus, as shown in FIG. 11, it is possible, while maintaining the abovementioned overlap or spacing parameters for the different core regions 210 or shell regions 220, to define, in a given layer Cx and within a core region (or, respectively, a shell region), at least two zones in which the scanning with the laser beam 120 is effected at two different orientation angles with respect to a trigonometric coordinate system.

Preferably, and as shown in FIG. 11, the different zones are in the form of a chequerboard with at least two rows and at least two columns of several square zones.

The odd rows bear the reference 3i and the even rows the reference 3p, the odd columns the reference 4i and the even columns the reference 4p.

The zones could also be hexagonal for example.

In the example shown in FIG. 11, and in the core region 210, the displacement vectors 121 of the laser beam 120 in the zones (3i-4i) situated at the intersection of the odd columns 4i and the odd rows 3i and referred to as "first zones" below are oriented at a first orientation angle α1, those in the zones (3i-4p) situated at the intersection of the even columns 4p and the odd rows 3i, referred to as "second zones" below, at a second orientation angle α2, those in the zones (3p-4i) situated at the intersection of the odd columns 4i and the even rows 3p, referred to as "third zones" below, at a third orientation angle α3 and those in the zones (3p-4p), referred to as "fourth zones" below, situated at the intersection of the even columns 4p and the even rows 3p at a fourth orientation angle α4. There could also be more than four different orientation angles on the chequerboard.

The same goes in the shell region 220 with first, second, third and fourth orientation angles β1, β2, β3 and β4.

Still in this same example, in the core region 210, α1 is oriented at 45°, α2 at 315°, α3 at 225° and α4 at 135°. These orientation angles could be different. It is apparent for example for α1 (45°) and α3 (225°) that the angular orientations are the same but the angles of orientation of the laser beam are opposite from the point of view of a trigonometric coordinate system. In the example in FIG. 11, the angles β1, β2, β3 and β4 are for their part equal to 45°, 270°, 135° and 0°, respectively.

Preferably, the orientation angle α1 of the first zones 3i-4i of the core region 210 of one layer Cx (see FIG. 11) exhibits an angular variation (referred to as "core angular variation") with the orientation angle α'1 of the first zones 3i-4i of the core region 210 of the layer Cx+1 situated thereabove (see FIG. 12). The same goes in each case for the different angles of two successive layers. In the example in FIG. 12, the angles α'1, α'2, α'3 and α'4 are equal to 10°, 280°, 190° and 100°, respectively. There is thus an angular variation of 35 degrees between α1 and α'1, and between α2 and α'2, α3 and α'3, α4 and α'4, respectively.

Similarly, preferably, the orientation angle β1 of the first zones 3i-4i of the shell region 220 of one layer Cx (see FIG. 11) exhibits an angular variation (referred to as "shell angular variation") with the orientation angle β'1 of the first zones 3i-4i of the shell region 220 of the layer Cx+1 situated thereabove (see FIG. 12). The same goes in each case for the different angles of two successive layers. In the example in FIG. 12, the angles β'1, β'2, β'3 and β'4 are equal to 225°, 90°, 315° and 180°, respectively. There is thus an angular variation of 180 degrees between β1 and β'1, and between β2 and β'2, β3 and β'3, β4 and β'4, respectively.

The core angular variation could be identical to the shell angular variation, but it is preferably different.

Figure 4:
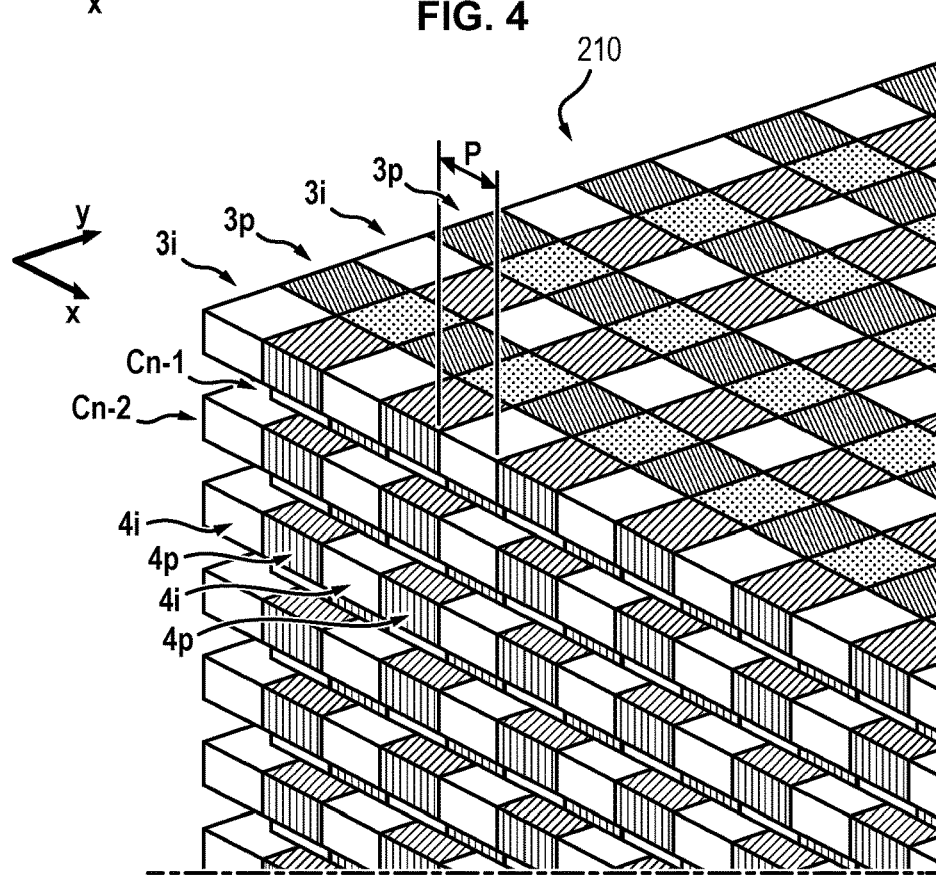
FIG. 4 is a schematic detail view of a stack of successive layers of metal powder, in which layers different zones having different melting parameters are shown.

Moreover, and as shown in FIG. 4, it is also possible for there to be an offset between the zones of two successive layers, for example the layers Cn-1 and Cn-2, of 1/q step P, for example, in this figure, of half a step (q=2) in a direction x and/or in a direction y.

In the example shown, the zones 3i-4i, 3i-4p, 3p-4i, 3p-4p of the layer Cn-2 of a core region 210 are thus offset by half a step P laterally (direction x) and longitudinally (direction y) with respect to the zones 3i-4i, 3i-4p, 3p-4i, 3p-4p of the layer Cn-1 situated immediately thereabove. The case could be the same in a shell region 220.

The invention claimed is:

1. A process for the additive manufacturing of a three-dimensional metal part having at least one monolithic part, the at least one monolithic part comprising an inner core part surrounded by an outer shell part, the process comprising:
successively solidifying successively deposited layers of metal powder by melting using a laser beam; and
defining in each of the successive layers of metal powder either at least one shell region, which constitutes a portion of the shell part or at least one core region, surrounded by a shell region, the core region constituting a portion of the inner core part,
wherein the melting of the at least one core region is effected by scanning with the laser beam so as to form longitudinal weld beads that have identical widths, are mutually parallel, and that are either juxtaposed or spaced apart from one another by a distance L2 less than X % of a width L of the weld beads, or overlap over a distance L1 less than X % of the width L,
wherein the melting of the at least one shell region is effected by scanning with the laser beam so as to form longitudinal weld beads that have identical widths L and an identical width to the weld beads of the at least one core region, are mutually parallel, and that overlap over a distance L3 greater than X % of the width L,
wherein X is greater than 0 and less than 100,
wherein the density of the inner core part of the manufactured three-dimensional metal part is less than the density of the outer shell part of the manufactured three-dimensional metal part,
wherein at least one core region of a layer of metal powder comprises at least two zones,
wherein, among the at least two zones, the scanning of at least one zone with the laser beam is effected such that displacement vectors of the laser beam have an orientation angle with respect to a trigonometric coordinate system that is different from an orientation angle of displacement vectors of the laser beam in a zone contiguous with the at least one zone,
wherein at least one shell region of a layer of metal powder comprises at least two zones, wherein, among the at least two zones, the scanning of at least one zone with the laser beam is effected such that displacement vectors of the laser beam have an orientation angle with respect to a trigonometric coordinate system that is different from an orientation angle of displacement vectors of the laser beam in a zone contiguous with the at least one zone, wherein the at least two zones of the at least one core region are square and disposed in a form of a checkerboard, the checkerboard comprising at least two rows designated as even and odd, wherein the at least two zones of the at least one shell region are square and disposed in a form of a checkerboard, the checkerboard comprising at least two rows designated as even and odd, wherein in each core region and each shell region the melting of at least one layer of metal powder is effected by scanning, with the laser beam, the zones of odd rows and of odd columns as first zones at a first orientation angle, the zones of odd rows and of even columns as second zones at a second orientation angle, the zones of even rows and of odd columns as third zones at a third orientation angle, and the zones of even rows and of even columns as fourth zones at a fourth orientation angle, the four orientation angles with respect to a trigonometric coordinate system being different, wherein the orientation angles of the displacement vectors of the laser beam in the first, second, third and fourth zones, respectively, of the core region of one layer exhibit an angular variation of 35° with the orientation angles of the displacement vectors of the laser beam in the first, second, third and fourth zones, respectively, of the core region of the layer situated thereabove, wherein the orientation angles of the displacement vectors of the laser beam in the first, second, third and fourth zones, respectively, of the shell region of one layer exhibit an angular variation with the orientation angles of the displacement vectors of the laser beam in the first, second, third and fourth zones, respectively, of the shell region of the layer situated thereabove, and wherein the annular variation in the core region and the angular variation in the shell region are different.

2. The process according to claim 1, wherein X is equal to 30.

3. The process according to claim 1, wherein the melting of the at least one shell region is effected by scanning with the laser beam so as to form weld beads that overlap over the distance L3 greater than 30% and less than or equal to 60% of the width L of the weld beads.

4. The process according to claim 1, wherein the inner core part and the outer shell part overlap over a width of between 0.01 mm and 0.40 mm.

5. The process according to claim 1, wherein the inner core part of the metal part comprises n successive superposed layers, and wherein the square core zones of one layer are offset by 1/q step, q being an integer, laterally, longitudinally, or both laterally and longitudinally, with respect to the square core zones of the layer situated immediately thereabove.

6. The process according to claim 1, wherein the outer shell part of the metal part comprises n successive superposed layers, and wherein the square shell zones of one layer are offset by 1/q step, q being an integer, laterally, longitudinally, or both laterally and longitudinally, with respect to the square shell zones of the layer situated immediately thereabove.

7. The process according to claim 1, wherein the melting of the at least one core region is effected by scanning with the laser beam so as to form adjacent weld beads that are spaced apart from one another by the distance L2 less than 20% of the width L of the weld beads.

8. The process according to claim 1, wherein the melting of the at least one core region is effected by scanning with the laser beam so as to form weld beads that overlap over the distance L1 less than 20% of the width L of the weld beads.

* * * * *